(12) United States Patent
Yoshida et al.

(10) Patent No.: US 11,130,891 B2
(45) Date of Patent: Sep. 28, 2021

(54) PHOTOCURABLE SEALING MATERIAL

(71) Applicant: Bostik SA, Colombes (FR)

(72) Inventors: Eita Yoshida, Yao (JP); Hiroyuki Nakatani, Yao (JP)

(73) Assignee: Bostik SA, Colombes (FR)

( * ) Notice: Subject to any disclaimer, the term of this patent is extended or adjusted under 35 U.S.C. 154(b) by 0 days.

(21) Appl. No.: 16/963,306

(22) PCT Filed: Jan. 10, 2019

(86) PCT No.: PCT/JP2019/000580
§ 371 (c)(1),
(2) Date: Jul. 20, 2020

(87) PCT Pub. No.: WO2019/146421
PCT Pub. Date: Aug. 1, 2019

(65) Prior Publication Data
US 2021/0054251 A1 Feb. 25, 2021

(30) Foreign Application Priority Data

Jan. 23, 2018 (JP) .............................. JP2018-008876

(51) Int. Cl.
| | |
|---|---|
| *C08F 2/46* | (2006.01) |
| *C08F 2/50* | (2006.01) |
| *C08G 61/04* | (2006.01) |
| *C09K 3/10* | (2006.01) |
| *C08F 2/48* | (2006.01) |
| *C08F 20/06* | (2006.01) |
| *C08K 5/37* | (2006.01) |

(52) U.S. Cl.
CPC .................. *C09K 3/10* (2013.01); *C08F 2/48* (2013.01); *C08F 20/06* (2013.01); *C08K 5/37* (2013.01)

(58) Field of Classification Search
CPC ... C09K 3/10; C09K 5/37; F16J 15/14; C08G 75/045; C08F 20/06; C08F 2/48; C08K 5/37
USPC .................................. 522/182, 178, 1; 520/1
See application file for complete search history.

(56) References Cited

U.S. PATENT DOCUMENTS

| | | |
|---|---|---|
| 2012/0041096 A1 | 2/2012 | Kurata et al. |
| 2013/0303651 A1 | 11/2013 | Nakatani et al. |

FOREIGN PATENT DOCUMENTS

| | | | | |
|---|---|---|---|---|
| CN | 104755579 A | 7/2015 | | |
| JP | 2010254853 A | 11/2010 | | |
| JP | 2015189851 A | 11/2015 | | |
| JP | 2016204401 A | 12/2016 | | |
| WO | 2013080737 A1 | 6/2013 | | |
| WO | WO-2013080737 A1 * | 6/2013 | ........... | C09D 133/14 |
| WO | 2014069027 A1 | 5/2014 | | |
| WO | WO-2014069027 A1 * | 5/2014 | ............... | C09K 3/10 |
| WO | 2013080737 A1 | 4/2015 | | |

OTHER PUBLICATIONS

Nakatani et al, WO 2013080737 Machine Translation, Jun. 6, 2013 (Year: 2013).*
Nakatani et al, WO 2014-069027 Machine Translation, May 8, 2014 (Year: 2014).*
TIPO; Office Action for Taiwanese Patent Application No. 108102504 dated May 27, 2020, 12 pages.
ISA/JP; International Search Report and Written Opinion for International Patent Application No. PCT/JP2019/000580 dated Mar. 26, 2019, 16 pages.
WIPO; International Preliminary Report on Patentability for International Patent Application No. PCT/JP2019/000580 dated Jul. 28, 2020, 13 pages.

* cited by examiner

*Primary Examiner* — Jessica Whiteley
(74) *Attorney, Agent, or Firm* — NK Patent Law

(57) ABSTRACT

A photocurable sealing material comprising at least a polythiol compound as a first component, wherein, in the case where the photocurable sealing material is used to produce two sheets having a thickness of 1 mm, a width of 25 mm, and a length of 200 mm, the two sheets are photocured by irradiation with an ultraviolet ray, then the photocured sheets are laminated, and the laminate is subjected to a load of 10 kg for 10 seconds, an action of causing the lamination interface between the two sheets to disappear is exhibited, and the self-adhesion strength in a T-type peel test is 5 N/25 mm or more when the sheets are pulled at a peel speed of 300 mm/min.

6 Claims, 2 Drawing Sheets

PHOTOCURABLE SEALING MATERIAL

CROSS-REFERENCE TO RELATED APPLICATIONS

This application is a U.S. National Stage application of International Patent Application No. PCT/JP2019/000580, filed on Jan. 10, 2019, which claims the benefit of Japanese Patent Application No. 2018-008876, filed on Jan. 23, 2018.

TECHNICAL FIELD

The present invention relates to a photocurable sealing material. The present invention more specifically relates to a photocurable sealing material having excellent sealing properties such as water-proof property.

BACKGROUND ART

In recent years, customer demand has increased on products having high sealing properties (water-proof property and air-tightness) in housings for electronic components for digital cameras, video cameras, and the like, home electric appliances such as refrigerators, air conditioners, and washing machines, and precision apparatuses such as cameras and watches.

CITATION LIST

Patent Literature

PTL 1: WO No. 2014/069027

SUMMARY OF INVENTION

Technical Problem

As the conventional sealing materials, there are known, for example, hot-melt adhesive agents, one-liquid type urethane-based reactive hot-melt adhesive agents, thermoplastic hot-melt sealing materials, moisture-curable hot-melt sealing materials, heat-curable sealing materials, two-liquid type urethane-based foamable sealing materials. However, all of these materials have the following problems: insufficient heat resistance, water-proof property and the like, cumbersome workability due to prevention of the inclusion of moisture or the like, necessity for an apparatus for heating, concern about thermal damage to housings, cumbersome workability of production by use of molds, or the like. There is no sealing material that can impart entirely satisfactory sealing properties to housings for electronic components, home electric appliances, precision apparatuses, and the like. Thus, such sealing materials are desired to be provided.

A photocurable sealing material enables production of a sealing material on a housing without using any mold, and thus has excellent workability and mass productivity compared with those of conventional sealing materials.

As the photocurable sealing material, there mainly exist photocurable sealing materials for which radical polymerization of an acryloyl group is employed and ene-thiol-based photocurable sealing materials for which an ene-thiol reaction is employed. A photocurable sealing materials for which radical polymerization of an acryloyl group is employed is produced by curing a composition including a urethane acrylate oligomer, an acrylate monomer, and a photopolymerization initiator (and a photo-sensitizer) with light or the like.

However, these photocurable sealing materials have not exhibited sufficient sealing properties because components for electronic products, home electric appliances, precision apparatuses, automobiles, and the like that are required to sandwich an inserting article (a cable, wire, or the like) have incomplete water-proof property, and water often penetrates from small gaps.

In consideration of the above circumstances, an object of the present invention is to provide a photocurable sealing material having excellent air-tightness and water-proof property.

Solution to Problem

The present inventors have made intensive studies for the purpose of solving the problems and, as a result, have found that, when sheets of a predetermined size are produced using a photocurable sealing material including at least a polythiol compound as a first component, sheets that exhibit a predetermined self-adhesiveness and self-adhesion strength have particularly excellent air-tightness and water-proof property, thereby having completed the present invention. That is, the present invention is as follows.

[1] A photocurable sealing material comprising at least a polythiol compound as a first component, wherein
in the case where the photocurable sealing material is used to produce two sheets having a thickness of 1 mm, a width of 25 mm, and a length of 200 mm, the two sheets are photocured by irradiation with an ultraviolet ray, then the photocured sheets are laminated, and the laminate is subjected to a load of 10 kg for 10 seconds, an action of causing the lamination interface between the two sheets to disappear is exhibited, and the self-adhesion strength in a T-type peel test is 5 N/25 mm or more when the sheets are pulled at a peel speed of 300 mm/min.

[2] The photocurable sealing material according to [1], wherein the self-adhesion strength is 1000 N/25 mm or less when the sheets are pulled at a peel speed of 300 mm/min.

[3] The photocurable sealing material according to [1] or [2], wherein the sheets after the photocuring have a Shore 00 hardness of 5 to 100 under an environment of a temperature of 23° C. and a relative humidity of 50 to 60% RH.

[4] The photocurable sealing material according to any of [1] to [3], wherein
the photocurable sealing material comprises, in addition to the first component, a second component and a third component and further comprises a fourth component and/or a fifth component,
the second component is an oligomer having a (meth)acryloyl group(s), the oligomer having a weight average molecular weight of 1000 to 30000,
the third component is a monomer having a (meth)acryloyl group(s),
the fourth component is a photo-radical polymerization initiator,
the fifth component is a viscosity modifier,
the photocurable sealing material comprises 5 to 100 parts by mass of the third component based on 100 parts by mass of the second component, and
the ratio between the total number of (meth)acryloyl groups contained in both of the second component and the third component and the total number of mercapto groups in the first component is 100:5n to 100:25n, wherein n is the number of mercapto groups per molecule of the polythiol compound.

[5] The photocurable sealing material according to [4], wherein the second component comprises at least one selected from the group consisting of a urethane-based (meth)acrylate oligomer, a polyester-based (meth)acrylate oligomer, a polyether-based (meth)acrylate oligomer, a (meth)acryl (meth)acrylate oligomer, an epoxy-based (meth)acrylate oligomer, a conjugated diene polymer-based (meth)acrylate oligomer, and a silicone (meth)acrylate oligomer, and hydrogenated products thereof.

[6] The photocurable sealing material according to [4] or [5], further comprising 0.1 to 15 parts by mass of a carbodiimide compound, as a sixth component, based on 100 parts by mass of the second component.

Advantageous Effects of Invention

According to the present invention, it becomes possible to provide a photocurable sealing material having excellent air-tightness and water-proof property.

DESCRIPTION OF EMBODIMENTS

Figure 1:
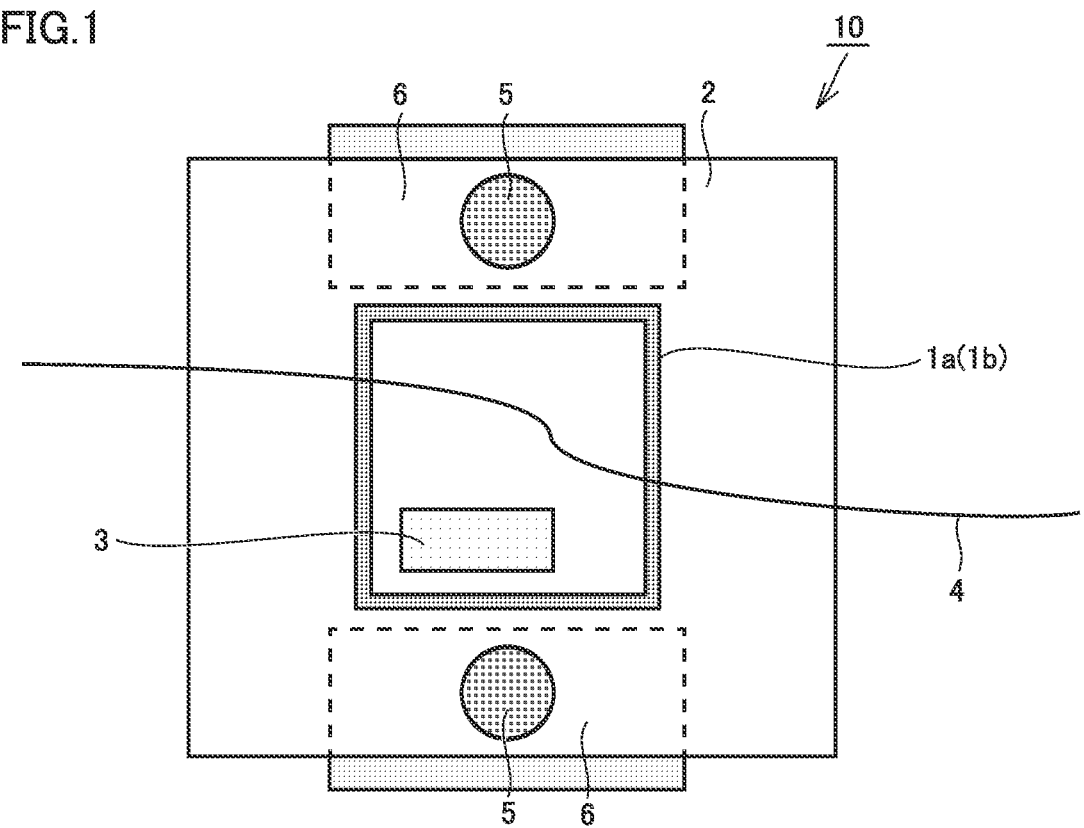
FIG. 1 is a schematic top cross-sectional view illustrating the configuration of a sample for evaluation of water-proof property.

Hereinafter, an embodiment of the present invention (also denoted by "the present embodiment") will be described with reference to examples, but the present invention is not intended to be limited thereto. The notation "A to B" in the present description means the upper and lower limits of a range (i.e., A or more and B or less). When A is followed by no unit and only B is followed by a unit, the unit for A is the same as the unit of B.

(Photocurable Sealing Material)

A photocurable sealing material according to the present embodiment is a photocurable sealing material comprising at least a polythiol compound as a first component, wherein, in the case where the photocurable sealing material is used to produce two sheets having a thickness of 1 mm, a width of 25 mm, and a length of 200 mm, the two sheets are photocured by irradiation with an ultraviolet ray, then the photocured sheets are laminated, and the laminate is subjected to a load of 10 kg for 10 seconds, an action of causing the lamination interface between the two sheets to disappear is exhibited, and the self-adhesion strength in a T-type peel test is 5 N/25 mm or more when the sheets are pulled at a peel speed of 300 mm/min. The photocurable sealing material described above, as having such a configuration, exhibits a predetermined self-adhesiveness and exerts an effect of having excellent air-tightness and water-proof property. Hereinbelow, the air-tightness and water-proof property may be together referred to as "sealing properties".

The "lamination interface" herein means a boundary surface at which the two sheets described above are superposed so as to be faced each other. The "self-adhesiveness" refers to a property with which, when the two sheet described above are laminated, the two sheets adhere to each other to be integrated, and the lamination interface becomes indiscernible (a property with which the lamination interface disappears). In other words, it is also graspable that, in the case where the photocurable sealing material is used to produce two sheets under the conditions mentioned above, the two sheets are photocured by irradiation with an ultraviolet ray, then the photocured sheets are laminated, and the laminate is subjected to a load of 10 kg for 10 seconds, the material exhibits self-adhesiveness.

As the ultraviolet ray to be applied onto the two sheets for photocuring the sheets, an ultraviolet ray emitted from a metal halide light source is used. An example of such a metal halide light source is a UV irradiation device of an electrodeless metal halide lamp type manufactured by Tokyo Foton Ltd. (trade name: FOTOCURE TFL-150).

In confirming the action of causing the lamination interface between the two sheets to disappear, the integrated quantity of UV-A light of the ultraviolet ray described above for photocuring the two sheets is 6000 mJ/cm$^2$.

The load of 10 kg to be imposed when the two sheets are laminated is uniformly imposed on the main surface of the sheets. An example of an apparatus that can uniformly impose the load is a tensile tester manufactured by ORIENTEC CORPORATION (current A&D Company, Limited).

"10 seconds" when the two sheets are laminated and the laminated sheets are subjected to a load of 10 kg means that 10 seconds has elapsed while a state in which the two sheets laminated are subjected to a load of 10 kg is maintained.

The "action of causing the lamination interface between the two sheets to disappear" is observed using a digital microscope manufactured by ANMO Electronics Corporation at a magnification of 50 times.

The "self-adhesion strength" according to the present embodiment means the breaking strength of the two sheets laminated. The self-adhesion strength is, when the sheets are pulled at a peel speed of 300 mm/min, 5 N/25 mm or more and preferably 15 N/25 mm or more. The self-adhesion strength is, when the sheets are pulled at a peel speed of 300 mm/min, more preferably 40 N/25 mm or more and even more preferably 80 N/25 mm or more. The upper limit of the self-adhesion strength is, for example, when the sheets are pulled at a peel speed of 300 mm/min, preferably 1000 N/25 mm or less, more preferably 800 N/25 mm or less, and even more preferably 300N/25 mm or less.

In a T-type peel test for measuring the self-adhesion strength described above, measurement is performed using a tensile tester (manufactured by ORIENTEC CORPORATION (current A&D Company, Limited), trade name: RTC-1310A).

<First Component: Polythiol Compound>

The polythiol compound as the first component means a compound having two or more mercapto groups. Examples of the polythiol compound described above include polythiol compounds having 2 to 10 mercapto groups in the molecule. Examples thereof preferably include polythiol compounds having 2 to 6 mercapto groups in the molecule. Examples thereof more preferably include polythiol compounds having 3 to 4 mercapto groups in the molecule.

Such polythiol compounds will be specifically described hereinbelow. Examples of the polythiol compound described above include:

(a) a polythiol compound including a hydrocarbon structure (e.g., aliphatic polythiols such as a $C_{2-20}$ alkane polythiol, aromatic aliphatic polythiols such as xylylene dithiol, polythiols obtained by substituting a halogen atom in a halohydrin adduct of alcohols with a mercapto group, and a polythiol compound including a reaction product of a polyepoxide compound with hydrogen sulfide);

(b) a polythiol compound including an ether structure represented by the formula (1), and
(c) a polythiol compound including an ester structure represented by the formula (2). In the formula (1) and the formula (2), $R^1$ and $R^2$ each independently represent a hydrogen atom or $C_{1-10}$ alkyl group, m is 0, 1, or 2, and p is 0 or 1. Note that notations as "$C_{2-20}$" and "$C_{1-10}$" mean that the numbers of carbon are 2 to 20 and 1 to 10, respectively (the same applies to the following).

[Formula 1]

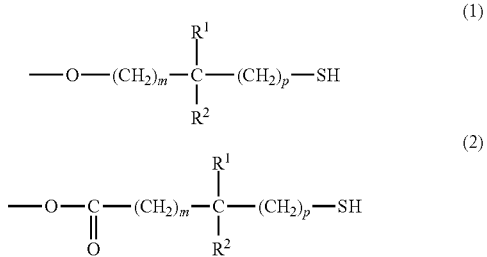

Among these polythiol compounds (a) to (c), preferred compounds are the polythiol compound including an ether structure (b) and the polythiol compound including an ester structure (c). More preferred is the polythiol compound including an ester structure (c).

Examples of the polythiol compound including a hydrocarbon structure (a) include 2,5-hexanedithiol, 2,9-decanedithiol, and 1,4-bis(1-mercaptoethyl)benzene.

Examples of the polythiol compound including an ether structure (b) include compounds each having a structure such as a 2-mercaptoethyl ether group, a 2-mercaptopropyl ether group, a 3-mercaptopropyl ether group, a 2-mercaptobutyl ether group, a 3-mercaptobutyl ether group, a 4-mercaptobutyl ether group, a 5-mercaptopentyl ether group, or a 5-mercaptohexyl ether group.

Examples of the polythiol compound including an ester structure (c) include a compound produced by esterifying a carboxylic acid containing a mercapto group, which is a compound in which a hydrogen atom is bound to the left terminal of the structure of formula (2), with polyhydric alcohols. A "polyhydric alcohol" means a compound including two or more hydroxyl groups.

Specific examples of the carboxylic acid containing a mercapto group, which is a compound in which a hydrogen atom is bound to the left terminal of the structure of formula (2), include thioglycolic acid, 2-mercaptopropionic acid, 3-mercaptobutyric acid, 2-mercaptoisobutyric acid, 3-mercaptoisobutyric acid, 3-mercaptopropionic acid, 3-mercapto-3-phenylpropionic acid, and 3-mercapto-3-methylbutyric acid. Preferred examples include 3-mercaptobutyric acid, 3-mercapto-3-phenylpropionic acid, and 3-mercapto-3-methylbutyric acid. A more preferred example is 3-mercaptobutyric acid.

Specific examples of the polyhydric alcohol to be used for esterification with the carboxylic acid containing a mercapto group described above include $C_{2-20}$ alkylene glycols (a $C_{2-10}$ alkylene group is preferred, in which the carbon chain may be branched; examples thereof include ethylene glycol, trimethylene glycol, 1,2-propylene glycol, 1,2-butanediol, 1,3-butanediol, 2,3-butanediol, tetramethylene glycol, 1,5-pentanediol, 1,6-hexanediol, 1,8-octanediol, 1,9-nonanediol, 1,12-dodecanediol, cyclohexane-1,4-dimethanol, and hydrogenated bisphenol-A.), diethylene glycol, poly(oxyalkylene)glycols, glycerin, triethylene glycol, polyethylene glycol, dipropylene glycol, tripropylene glycol, polypropylene glycol, polytetramethylene ether glycol, trimethylolpropane, ditrimethylolpropane, pentaerythritol, dipentaerythritol, cyclohexanediol, cyclohexanedimethanol, norbornene dimethanol, norbornane dimethanol, polycarbonate diol, polysilicones modified with a hydroxy group at each terminal, polyols containing an aromatic ring, tris-2-hydroxyethyl isocyanurate, 2,2-bis[4-(2-hydroxyethyloxy)phenyl]propane, hydrogenated bisphenol-A, 4,4'-(9-fluorenylidene)bis(2-phenoxyethanol), cyclohexane-1,4-dimethanol ethylene oxide adducts, hydrogenated bisphenol-A ethylene oxide adducts, cyclohexane-1,4-dimethanolpropylene oxide adducts, and hydrogenated bisphenol-A propylene oxide adducts.

Preferred examples of the polyhydric alcohol include alkylene glycols having a alkylene main chain of two carbon atoms, such as ethylene glycol, 1,2-propylene glycol, and 1,2-butanediol, trimethylolpropane, polycarbonate diol, cyclohexane diol, cyclohexanedimethanol, and 1,5-pentanediol. Examples of the polyol containing an aromatic ring include 2,2-bis[4-(2-hydroxyethyloxy)phenyl]propane, 4,4'-(9-fluorenylidene)diphenol, and 4,4'-(9-fluorenylidene)bis(2-phenoxyethanol).

Examples of the polythiol compound including such an ester structure (c) include polythiol compounds represented by the formula (3) or the formula (4). In the formula (3), $R^3$ to $R^6$ each independently represent a hydrogen atom or $C_{1-10}$ alkyl group. In the formula (3) and in the formula (4), L-(CO)—O— represents the structure represented by the formula (2) described above.

[Formula 2]

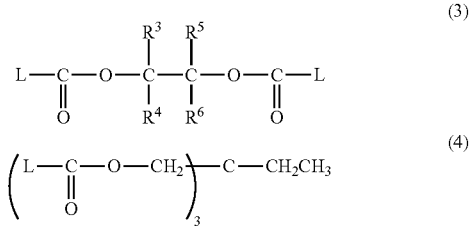

As the $C_{1-10}$ alkyl group corresponding to each of $R^3$ to $R^6$ in the formula (3), a linear or branched $C_{1-3}$ alkyl group is preferred. Specific examples of the $C_{1-10}$ alkyl group include a methyl group, an ethyl group, a n-propyl group, and an isopropyl group. Among these groups, a methyl group and an ethyl group are preferred. Particularly preferred is a polythiol compound in which $R^3$ is a hydrogen atom, a methyl group, or an ethyl group, and all of $R^4$ to $R^6$ are hydrogen atoms.

Specific examples of the polythiol compound represented by the formula (3) or the formula (4) include ethylene glycol bis(3-mercaptobutyrate), propylene glycol bis(3-mercaptobutyrate), diethylene glycol bis(3-mercaptobutyrate), butanediol bis(3-mercaptobutyrate), octanediol bis(3-mercaptobutyrate), trimethylolpropane tris(3-mercaptobutyrate), pentaerythritol tetrakis(3-mercaptobutyrate), dipentaerythritol hexakis(3-mercaptobutyrate), 1,3-butanediol bis(3-mercaptobutyrate), 1,4-butanediol bis(3-mercaptobutyrate), neopentyl glycol bis(3-mercaptobutyrate), 1,6-hexanediol bis(3-mercaptobutyrate), 1,8-octanediol bis(3-mercaptobutyrate), 1,9-nonanediol bis(3-mercaptobutyrate), cyclohexane-1,4-dimethanol bis(3- mercaptobutyrate), diethylene glycol bis(3-mercaptobutyrate), triethylene glycol bis(3-mercaptobutyrate), polyethylene glycol bis(3-mercaptobutyrate), dipropylene glycol bis(3-mercaptobutyrate), tripropylene glycol bis(3-mercaptobutyrate), polypropylene glycol bis(3-mercaptobutyrate), polytetramethylene ether glycol bis(3-mercaptobutyrate), bis(3-mercaptobutyrate) of a cyclohexane-1,4-dimethanol ethylene oxide adduct, bis(3-mercaptobutyrate) of a hydrogenated bisphenol-A ethylene oxide adduct, bis (3-mercaptobutyrate) of a cyclohexane-1,4-dimethanol propylene oxide adduct, bis(3-mercaptobutyrate) of a hydrogenated bisphenol-A propylene oxide adduct, glycerol tris(3-mercaptobutyrate), diglycerol tetrakis(3-mercaptobutyrate), trimethylolpropane tris(3-mercaptobutyrate), ditrimethylolpropane tetrakis(3-mercaptobutyrate), pentaerythritol tetrakis(3-mercaptobutyrate), dipentaerythritol hexakis(3-mercaptobutyrate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), trimethylolpropane tris(2-mercaptopropionate), pentaerythritol tetrakis(2-mercaptopropionate), dipentaerythritol hexakis(2-mercaptopropionate), ethylene glycol bis(3-mercaptoisobutyrate), propylene glycol bis(3-mercaptoisobutyrate), diethylene glycol bis(3-mercaptoisobutyrate), butanediol bis(3-mercaptoisobutyrate), octanediol bis(3-mercaptoisobutyrate), trimethylolpropane tris(3-mercaptoisobutyrate), pentaerythritol tetrakis(3-mercaptoisobutyrate), dipentaerythritol hexakis(3-mercaptoisobutyrate), ethylene glycol bis(2-mercaptoisobutyrate), propylene glycol bis(2-mercaptoisobutyrate), diethylene glycol bis(2-mercaptoisobutyrate), butanediol bis(2-mercaptoisobutyrate), octanediol bis(2-mercaptoisobutyrate), trimethylolpropane tris(2-mercaptoisobutyrate), pentaerythritol tetrakis(2-mercaptoisobutyrate), dipentaerythritol hexakis(2-mercaptoisobutyrate), ethylene glycol bis(4-mercaptovalerate), propylene glycol bis(4-mercaptoisovalerate), diethylene glycol bis(4-mercaptovalerate), butanediol bis(4-mercaptovalerate), octanediol bis(4-mercaptovalerate), trimethylolpropane tris(4-mercaptovalerate), pentaerythritol tetrakis(4-mercaptovalerate), dipentaerythritol hexakis(4-mercaptovalerate), ethylene glycol bis(3-mercaptovalerate), propylene glycol bis(3-mercaptovalerate), diethylene glycol bis(3-mercaptovalerate), butanediol bis(3-mercaptovalerate), octanediol bis(3-mercaptovalerate), trimethylolpropane tris(3-mercaptovalerate), pentaerythritol tetrakis(3-mercaptovalerate), dipentaerythritol hexakis(3-mercaptovalerate), hydrogenated bisphenol-A bis(3-mercaptobutyrate), bisphenol-A dihydroxyethyl ether-3-mercaptobutyrate, 4,4'-(9-fluorenylidene)bis(2-phenoxyethyl(3-mercaptobutyrate)), ethylene glycol bis(3-mercapto-3-phenylpropionate), propylene glycol bis(3-mercapto-3-phenylpropionate), diethylene glycol bis(3-mercapto-3-phenylpropionate), butanediol bis(3-mercapto-3-phenylpropionate), octanediol bis(3-mercapto-3-phenylpropionate), trimethylolpropane tris(3-mercapto-3-phenylpropionate), tris-2-(3-mercapto-3-phenylpropionate) ethyl isocyanurate, pentaerythritol tetrakis(3-mercapto-3-phenylpropionate), dipentaerythritol hexakis(3-mercapto-3-phenylpropionate), ethylene glycol bis (thioglycolate), trimethylene glycol bis(thioglycolate), propylene glycol bis (thioglycolate), 1,3-butanediol bis(thioglycolate), 1,4-butanediol bis(thioglycolate), neopentyl glycol bis(thioglycolate), 1,6-hexanediol bis(thioglycolate), 1,8-octanediol bis (thioglycolate), 1,9-nonanediol bis(thioglycolate), cyclohexane-1,4-dimethanol bis(thioglycolate), diethylene glycol bis(thioglycolate), triethylene glycol bis(thioglycolate), polyethylene glycol bis(thioglycolate), dipropylene glycol bis(thioglycolate), tripropylene glycol bis(thioglycolate), polypropylene glycol bis(thioglycolate), polytetramethylene ether glycol bis(thioglycolate), a bis(thioglycolate) of a cyclohexane-1,4-dimethanol ethylene oxide adduct, a bis(thioglycolate) of a hydrogenated bisphenol-A ethylene oxide adduct, a bis(thioglycolate) of a cyclohexane-1,4-dimethanol propylene oxide adduct, a bis(thioglycolate) of a hydrogenated bisphenol-A propylene oxide adduct, glycerol tris(thioglycolate), diglycerol tetrakis(thioglycolate), trimethylolpropane tris(thioglycolate), ditrimethylolpropane tetrakis(thioglycolate), pentaerythritol tetrakis(thioglycolate), dipentaerythritol hexakis(thioglycolate), ethylene glycol bis (3-mercaptopropionate), trimethylene glycol bis(3-mercaptopropionate), propylene glycol bis(3-mercaptopropionate), 1,3-butanediol bis(3-mercaptopropionate), 1,4-butanediol bis(3-mercaptopropionate), neopentyl glycol bis(3-mercaptopropionate), 1,6-hexanediol bis(3-mercaptopropionate), 1,8-octanediol bis(3-mercaptopropionate), 1,9-nonanediol bis(3-mercaptopropionate), cyclohexane-1,4-dimethanol bis (3-mercaptopropionate), diethylene glycol bis(3-mercaptopropionate), triethylene glycol bis(3-mercaptopropionate), polyethylene glycol bis(3-mercaptopropionate), dipropylene glycol bis(3-mercaptopropionate), tripropylene glycol bis(3-mercaptopropionate), polypropylene glycol bis(3-mercaptopropionate), polytetramethylene ether glycol bis(3-mercaptopropionate), a bis(3-mercaptopropionate) of a cyclohexane-1,4-dimethanol ethylene oxide adduct, a bis(3-mercaptopropionate) of a hydrogenated bisphenol-A ethylene oxide adduct, a bis(3-mercaptopropionate) of a cyclohexane-1,4-dimethanol propylene oxide adduct, a bis(3-mercaptopropionate) of a hydrogenated bisphenol-A propylene oxide adduct, glycerol tris(3-mercaptopropionate), diglycerol tetrakis(3-mercaptopropionate), trimethylolpropane tris(3-mercaptopropionate), ditrimethylolpropane tetrakis(3-mercaptopropionate), pentaerythritol tetrakis(3-mercaptopropionate), and dipentaerythritol hexakis(3-mercaptopropionate).

Among these polythiol compounds, polythiol compounds having two or more 3-mercaptobutyrate groups are preferred. Particularly preferred are polyethylene glycol bis(3-mercaptobutyrate), pentaerythritol tetrakis(3-mercaptobutyrate), dipentaerythritol hexakis(3-mercaptobutyrate), and the like. Specific examples of the structure of the preferred polythiol compound are represented by the following formula (5) to formula (14). In the formula (14), q is an integer of 1 to 10.

[Formula 3]

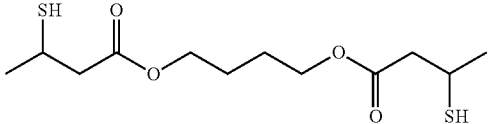

(5)

-continued

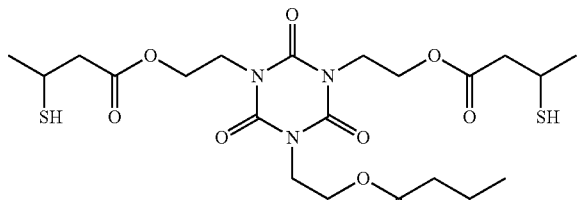
(6)

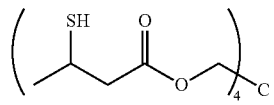
(7)

[Formula 4]

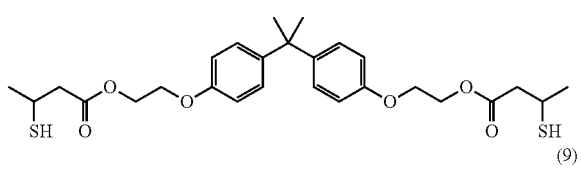
(8)

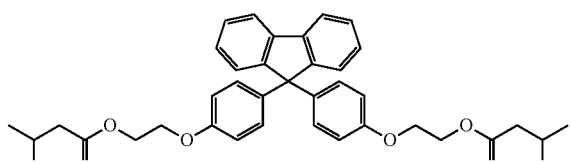
(9)

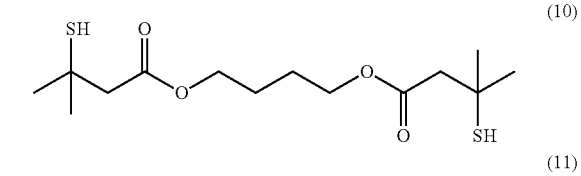
(10)

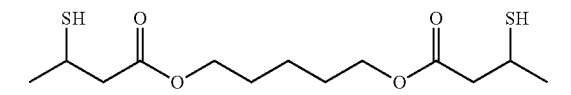
(11)

[Formula 5]

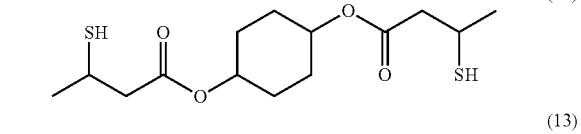
(12)

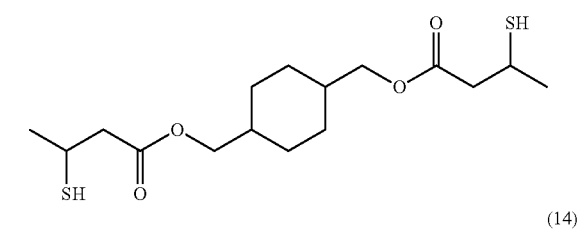
(13)

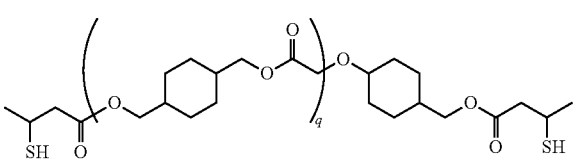
(14)

The polythiol compounds described above may be other compounds than the polythiol compound including a hydrocarbon structure (a), the polythiol compound including an ether structure (b), and the polythiol compound including an ester structure (c) mentioned above. As the polythiol compound, for example, phthalic acid di(1-mercaptoethyl ester), phthalic acid di(2-mercaptopropyl ester), phthalic acid di(3-mercaptobutyl ester), phthalic acid di(3-mercaptoisobutyl ester), or the like may be used.

Preferred examples of the polythiol compound include compounds having a secondary mercapto groups, that is, secondary thiol compounds. A secondary thiol compound itself has superior storage stability to that of a primary thiol compound. A sealing material produced using the photocurable sealing material of the present embodiment has superior sealing properties to those of conventionally known photocurable sealing materials. When a polythiol compound having a secondary mercapto group is used, the photocurable sealing material of the present embodiment has excellent coating stability upon coating and excellent stability of the sealing properties. Particularly with respect to hardness and flexibility, excellent properties can be stably obtained. As a reason for this fact, it is assumed that the balance between the radical reaction in the ene-thiol reaction and the thermal addition reaction is adjusted in a preferred manner by the steric hindrance around the mercapto group, for example.

The amount of the polythiol compound to be used is such an amount that the ratio between the total number of (meth)acryloyl groups contained in both of the second component (oligomer having a (meth)acryloyl group(s)) and the third component (monomer having a (meth)acryloyl group(s)) mentioned below and the total number of mercapto groups contained in the first component is 100:5n to 100:25n (n is the number of mercapto groups per molecule of the polythiol compound). The amount is preferably such an amount that the ratio is 100:7n to 100:20n and more preferably such an amount that the ratio is 100:9n to 100:17n.

It is preferred that the photocurable sealing material comprise, in addition to the first component, a second component and a third component and further comprise a fourth component and/or a fifth component, the second component be an oligomer having a (meth)acryloyl group(s), the oligomer having a weight average molecular weight of 1000 to 30000, the third component be a monomer having a (meth)acryloyl group(s), the fourth component be a photo-radical polymerization initiator, the fifth component be a viscosity modifier, the photocurable sealing material comprise 5 to 100 parts by mass of the third component based on 100 parts by mass of the second component, and the ratio between the total number of (meth)acryloyl groups contained in both of the second component and the third component and the total number of mercapto groups in the first component be 100:5n to 100:25n. n is the number of mercapto groups per molecule of the polythiol compound. The "(meth)acryloyl group" means an acryloyl group or a methacryloyl group as routinely used in the art.

The photocurable sealing material preferably further comprises 0.1 to 15 parts by mass of a carbodiimide compound, as a sixth component, based on 100 parts by mass of the second component. Hereinbelow, each of the components will be described.

<Second Component: Oligomer Having (Meth)Acryloyl Group(s), Having Weight Average Molecular Weight of 1000 to 30000>

The weight average molecular weight of the oligomer as the second component is preferably 1000 to 30000, more preferably 2000 to 25000, even more preferably 3000 to 25000, further more preferably 4000 to 22000, and particularly preferably 5000 to 18000. The weight average molecular weight can be measured by gel permeation chromatography (GPC), for example. Preferred examples of the oligomer as the second component include oligomers having at least two (meth)acrylate groups in the molecule. The number of (meth)acrylate groups per molecule of the oligomer as the second component is, for example, 2 to 10, preferably 2 to 6, more preferably 2 to 4, and particularly preferably 2. The "(meth)acrylate group" means an acrylate group or a methacrylate group as routinely used in the art.

Examples of the oligomer as the second component include urethane-based (meth)acrylate oligomers, polyester-based (meth)acrylate oligomers, polyether-based (meth) acrylate oligomers, (meth)acryl (meth)acrylate oligomers, epoxy-based (meth)acrylate oligomers, conjugated diene polymer-based (meth)acrylate oligomers such as polybutadiene oligomers, and silicone (meth)acrylate oligomers, and hydrogenated products thereof.

A urethane-based (meth)acrylate oligomer means a (meth)acrylate oligomer having a urethane bond. The urethane-based (meth)acrylate oligomer is, for example, an oligomer obtained by reacting a polyol such as a polyether polyol, a polyester polyol, or a carbonate diol with a polyisocyanate to obtain a polyurethane oligomer and then esterifying the oligomer with (meth)acrylic acid. Here, a "(meth)acrylic acid" means acrylic acid or methacrylic acid as routinely used in the art.

A polyester-based (meth)acrylate oligomer means a (meth)acrylate oligomer having an ester bond. The polyester-based (meth)acrylate oligomer is, for example, an oligomer obtained by condensing a polycarboxylic acid and a polyhydric alcohol or adding an alkylene oxide to a polycarboxylic acid to obtain a polyester oligomer having a hydroxy group at each terminal and esterifying the hydroxy groups with (meth)acrylic acid.

A polyether-based (meth)acrylate oligomer means a (meth)acrylate oligomer having an ether bond. The polyether-based (meth)acrylate oligomer is, for example, an oligomer obtained by esterifying a hydroxy group in a polyether polyol with (meth)acrylic acid.

The (meth)acryl (meth)acrylate oligomer is, for example, a telechelic polyacrylate having a highly controlled structure by applying an atom transfer radical polymerization (ATRP) method. The "(meth)acryl" means acryl or methacryl as routinely used in the art.

An epoxy-based (meth)acrylate oligomer means a (meth) acrylate oligomer having an epoxy group. The epoxy-based (meth)acrylate oligomer is, for example, an oligomer obtained by reacting a (meth)acrylic acid to an oxirane ring in a bisphenol-type epoxy resin or a novolac-type epoxy resin each having a relatively low molecular weight to esterify the oxirane ring. The epoxy-based (meth)acrylate oligomer also includes a carboxyl-modified epoxy acrylate oligomer obtained by partially modifying the epoxy-based (meth)acrylate oligomer with a dicarboxylic acid anhydride.

A conjugated diene polymer-based (meth)acrylate oligomer means an oligomer obtained by esterifying a conjugated diene polymer with (meth)acrylic acid. Examples of the conjugated diene polymer-based (meth)acrylate oligomer include an SBR diacrylate obtained by esterifying a liquid styrene-butadiene copolymer with acrylic acid, a polyisoprene diacrylate obtained by esterifying polyisoprene with acrylic acid, a polybutadiene acrylate obtained by esterifying polybutadiene with acrylic acid, and a polybutadiene acrylate obtained by reacting a (meth)acrylate having an isocyanate group with 1,2-polybutadiene having hydroxy groups at the terminals.

A silicone (meth)acrylate oligomer means a (meth)acrylate oligomer having a siloxane bond. Examples of the silicone (meth)acrylate oligomer include ester compounds obtained by esterifying a hydroxyl group in an alcoholic siloxane compound with acrylic acid.

The oligomer as the second component may be used singly, or two or more of such oligomers may be used in combination. Preferred examples of the oligomer as the second component include urethane-based (meth)acrylate oligomers such as a urethane-based polyester (meth)acrylate oligomer. The urethane-based polyester (meth)acrylate oligomer can be obtained by reacting a polyether polyol with a polyisocyanate to obtain a polyurethane oligomer and then esterifying the polyurethane oligomer with (meth)acrylic acid.

In a urethane-based (meth)acrylate oligomer having two (meth)acryloyl groups, which is a preferred oligomer as the second component, examples of a polyether diol, a polyester diol, and a carbonate diol each having two hydroxyl groups to be used for producing the oligomer include the following.

Examples of the polyether diol include polyethylene glycol, polypropylene glycol, polytetramethylene glycol, polyhexamethylene glycol, and polyether diols obtained by adding ethylene oxide or propylene oxide to 1,3-butylene glycol, 1,4-butylene glycol, neopentyl glycol, cyclohexanedimethanol, 2,2-bis(4-hydroxycyclohexyl)propane, bisphenol-A or the like.

Examples of the polyester diol include polyester diols obtained by reacting compounds obtained by adding ethylene oxide, propylene oxide, or the like to polyethylene glycol, polypropylene glycol, polytetramethylene glycol, 1,3-butylene glycol, 1,4-butylene glycol, 1,6-hexanediol, neopentyl glycol, 1,4-cyclohexanedimethanol, 2,2-bis(4-hydroxycyclohexyl)propane, bisphenol-A or the like, or, an alcohol having an ε-caprolactone added thereto with a dicarboxylic acid such as adipic acid, sebacic acid, azelaic acid or dodecanedicarboxylic acid or an anhydride of the dicarboxylic acid such as adipic acid, sebacic acid, azelaic acid, or dodecanedicarboxylic acid or an anhydride thereof.

Examples of the carbonate diol include carbonate diols obtained by reacting diaryl carbonates or a dialkyl carbonates such as diphenyl carbonate, bis-chlorophenyl carbonate, dinaphthyl carbonate, phenyl-toluyl-carbonate, phenyl-chlorophenyl-carbonate, 2-tolyl-4-tolyl-carbonate, dimethyl carbonate, or diethyl carbonate with a diols such as 1,6-hexanediol, neopentyl glycol, 1,4-butanediol, 1,8-octanediol, 1,4-cyclohexanedimethanol, 2-methylpropanediol, dipropylene glycol, or dibutylene glycol.

<Third Component: Monomer Having (Meth)Acryloyl Group(s)>

Examples of the monomer having a (meth)acryloyl group(s) in the present embodiment include (meth)acrylate monomers and (meth)acrylamide monomers. Hereinbelow, such monomers will be described in detail.

(Meth)acrylate Monomer

The (meth)acrylate monomer is a (meth)acrylate monomer having at least one (meth)acryloyl group in the molecule. Specific examples thereof include monofunctional monomers having one (meth)acryloyl group, bifunctional monomers having two (meth)acryloyl groups, trifunctional monomers having three (meth)acryloyl groups, and tetrafunctional monomers having four (meth)acryloyl groups. The (meth)acrylate monomer also may be a (meth)acrylate monomer having at least one polar group selected from the group consisting of a hydroxyl group, a carboxyl group, and an amino group.

Examples of the monofunctional monomer include methyl methacrylate, butyl methacrylate, 2-phenoxyethyl acrylate, ethoxylated 2-phenoxyethyl acrylate, 2-(2-ethoxyethoxyl)ethyl acrylate, EO-modified phenol acrylate, cyclic trimethylolpropane, formal acrylate, β-carboxyethyl acrylate, lauryl methacrylate, isooctyl acrylate, stearyl methacrylate, isodecyl acrylate, isostearyl acrylate, isobornyl methacrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxyethyl)isocyanurate triacrylateacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, di-trimethylolpropane tetraacrylate, propoxylated pentaerythritol tetraacrylate, pentaerythritol tetraacrylate, dipentaerythritol hexaacrylate, methacrylate, hydroxyethyl acrylate (HEA), 2-hydroxyethyl methacrylate (HEMA), tripropylene glycol dimethacrylate, 1,4-butanediol dimethacrylate, 1,6-hexanediol dimethacrylate, arylated cyclohexyl dimethacrylate, isocyanurate dimethacrylate, ethoxylated trimethylolpropane trimethacrylate, propoxylated glycerol trimethacrylate, trimethylolpropane trimethacrylate, tris(acryloxyethyl)isocyanurate, 4-hydroxybutyl acrylate, 2-hydroxy-3-phenoxypropyl acrylate, and combinations of two or more of these.

Examples of the bifunctional monomer include 1,6-hexanediol diacrylate, bisphenol-A ethoxylated acrylate, polyethylene glycol diacrylate (200-600), tripropylene glycol diacrylate, neopentyl glycol propoxylate (2), ethoxylated (2) neopentyl glycol diacrylate, dipropylene glycol diacrylate, trimethylolpropaneethoxylated (3) methyl ether diacrylate, and combinations of two or more of these.

Examples of the trifunctional monomer include trimethylolpropane triacrylate, trimethylolpropane propoxylated (5-20) triacrylate, propoxylated (4) glycerol triacrylate, ethoxylated (3) trimethylolpropane triacrylate, propoxylated pentaerythritol triacrylate, and combinations of two or more of these.

Examples of the tetrafunctional monomer include ditrimethylolpropane tetraacrylate, dipentaerythritol mono-hydroxy pentaacrylate, and combinations of two or more of these.

The (meth)acrylate monomer may be used singly, or two or more of such (meth)acrylate monomers may be used in combination. A preferred (meth)acrylate monomer is a monofunctional monomer. As the (meth)acrylate monomer, a combination of a monofunctional monomer and a bifunctional monomer is also preferred. A more preferred one is a monofunctional monomer.

(Meth)acrylamide Monomer

The (meth)acrylamide monomer include a (meth)acrylamide monomer represented by $CH_2=CX(CO)NR_2$ (where X represents a hydrogen atom or a methyl group, and two R's may be each independently a linear substituent or may be combined to form a cyclic substituent). A "(meth)acrylamide monomer" means an acrylamide monomer or a methacrylamide monomer as routinely used in the art. Examples of the (meth)acrylamide monomer described above include (meth)acryloyl morpholine monomers as represented by the following formula (15) and dimethyl acrylamide monomers. In the formula (15), X represents a hydrogen atom or methyl. The (meth)acrylamide monomer preferably includes a (meth)acryloyl morpholine monomer. Preferably, the (meth) acryloyl morpholine monomer includes an acryloyl morpholine monomer.

[Formula 6]

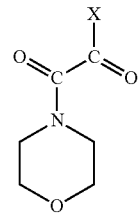

(15)

Preferably used is an amount of the monomer having a (meth)acryloyl group(s) to be used in the range of 5 to 100 parts by mass based on 100 parts by mass of the oligomer having a (meth)acryloyl group(s) as the second component. When the amount in this range is used, the viscosity of the photocurable sealing material of the present embodiment decreases, and thus, the flexibility of the photocurable sealing material can be further enhanced. The amount of the monomer having a (meth)acryloyl group(s) to be used is more preferably in the range of 10 to 80 parts by mass and even more preferably in the range of 40 to 70 parts by mass based on 100 parts by mass of the second component. The type and the amount of the monomer having a (meth) acryloyl group(s) can be adjusted for achieving the properties such as viscosity and flexibility depending on the uses of the photocurable sealing material of the present embodiment.

<Fourth Component: Photo-Radical Polymerization Initiator>

As the photo-radical polymerization initiator, for example, an intramolecular-cleavage-type and/or hydrogen-abstraction-type photo-radical polymerization initiator can be used. The photo-radical polymerization initiator is preferably an intramolecular-cleavage-type photo-radical polymerization initiator. As a radical ultraviolet ray polymerization initiator, any known one may be used properly. Specific examples thereof include benzoins and alkyl ethers thereof, such as benzoin, benzoin methyl ether, and benzoin ethyl ether; acetophenones such as acetophenone, 2,2-dimethoxy-2-phenyl acetophenone, 1,1-dichloro acetophenone, 4-(1-t-butyldioxy-1-methylethyl) acetophenone, and diethoxy acetophenone; anthraquinones such as 2-methylanthraquinone, 2-amylanthraquinone, 2-t-butylanthraquinone, and 1-chloroanthraquinone; thioxanthones such as 2,4-dimethylthioxanthone, 2,4-diisopropylthioxanthone, and 2-chlorothioxanthone; ketals such as acetophenone dimethyl ketal and benzyl dimethyl ketal; benzophenones such as benzophenone, 4-(1-t-butyldioxy-1-methylethyl)benzophenone, and 3,3',4,4'-tetrakis(t-butyldioxycarbonyl)benzophenone; α-aminoalkylphenones such as 2-methyl-1-[4-

(methylthio)phenyl]-2-morpholino-propan-1-one and 2-benzyl-2-dimethylamino-1-(4-morpholinophenyl)-1-butanone; α-hydroxyalkylphenones such as 1-hydroxy-cyclohexyl-phenyl-ketone, 2-hydroxy-1{4-[4-(2-hydroxy-2-methyl-propionyl)-benzyl]phenyl}-2-methyl-propan-1-one, and 2-hydroxy-2-methyl-1-phenyl-propan-1-one; phenyl glyoxylates such as alkyl phenyl glyoxylates; diethoxy acetophenone; acyl phosphine oxides such as 2,4,6-trimethyl benzoyl phenyl ethoxy phosphine oxide; titanocene compounds such as bis(5,2,4-cyclopentadiene-1-yl)-bis(2,6-difluoro-3-(1H-pyrrol-1-yl)-phenyl)titanium; and combinations of two or more of these.

Preferred examples of the photo-radical polymerization initiator include intramolecular-cleavage-type photo-radical initiators such as benzoins, ketals, α-hydroxyalkylphenones, α-aminoalkylphenones, acyl phosphine oxides, phenyl glyoxylates, acetophenones, and titanocene compounds.

The amount of the photo-radical polymerization initiator to be added is not particularly limited, and is, for example, 0.1 to 10 parts by mass based on 100 parts by mass of the total amount of the first component to the third component. The amount to be added described above is preferably 0.2 to 5 parts by mass and more preferably 0.5 to 2 parts by mass based on 100 parts by mass of the total amount of the first component to the third component.

<Fifth Component: Viscosity Modifier>

The viscosity modifier is not particularly limited, and examples thereof include inorganic viscosity modifiers such as white carbon, colloidal silica, silica sand (silica powder), aerosil, diatomaceous earth, hydrophobic calcium carbonate, glass balloons, and glass beads, and polyvinyl pyrrolidone. One of these viscosity modifiers may be used singly, or two or more of these may be used in combination. Preferred examples of the viscosity modifier include inorganic viscosity modifiers.

The amount of the viscosity modifier to be added is not particularly limited, and is, for example, 0.1 to 20 parts by mass and preferably 0.2 to 10 parts by mass based on the total amount of 100 parts by mass of the first component to the third component.

<Sixth Component: Carbodiimide Compound>

A carbodiimide compound means a compound including a carbodiimide group. The carbodiimide compound described above serves as a hydrolysis-resistant stabilizer (hydrolysis-resistant agent) that blocks a hydroxy group or a carboxyl group generated by hydrolysis of a resin such as a polyester to suppress the cycle of the hydrolysis. Examples of the carbodiimide compound include monocarbodiimide compounds and polycarbodiimide compounds, which are widely known and any of which can be used. The carbodiimide compounds are mentioned in, for example, Japanese Patent Laying-Open No. 09-309871, Japanese Patent Laying-Open No. 09-249801, Japanese Patent Laying-Open No. 09-208649, Japanese Patent Laying-Open No. 09-296097, Japanese Patent Laying-Open No. 08-081533, Japanese Patent Laying-Open No. 08-027092, Japanese Patent Laying-Open No. 09-136869, Japanese Patent Laying-Open No. 09-124582, Japanese Patent Laying-Open No. 09-188807, Japanese Patent Laying-Open No. 2005-082642, Japanese Patent Laying-Open No. 2005-053870, Japanese Patent Laying-Open No. 2012-036392, Japanese Patent Laying-Open No. 2010-163203, Japanese Patent Laying-Open No. 2011-174094, WO 2008/072514, Japanese Patent Laying-Open No. 2012-081759, Japanese Patent Laying-Open No. 2012-052014, and Japanese Patent Laying-Open No. 2012-007079.

Examples of the polycarbodiimide compound include compounds represented by, for example, the formula: $R^{12}$—(—N=C=N—$R^{11}$—)$_r$—$R^{13}$. In the formula, each $R^{11}$ in the repeating units may be the same or different from each other, and is a divalent aromatic group and/or an aliphatic group. r is a natural number.

In the case of an aromatic oligomeric carbodiimide or an aromatic polymeric carbodiimide, $R^{11}$ may be substituted with an aliphatic substituent and/or an alicyclic substituent and/or an aromatic substituent each having at least one carbon atom. Here, the substituent may have a hetero atom. The substitution by the substituent may be located at least one ortho-position in an aromatic group to which the carbodiimide group is bound $R^{12}$ is $C_1$ to $C_{18}$ alkyl, $C_5$ to $C_{18}$ cycloalkyl, aryl, $C_7$ to $C_{18}$ aralkyl, —$R^{11}$—NH—COS—$R^{14}$, —$R^{11}$COOR$^{14}$, —$R^{11}$—OR$^{14}$, —$R^{11}$—N(R$^{14}$)$_2$, —$R^{11}$—SR$^{14}$, —$R^{11}$—OH, —$R^{11}$—NH$_2$, —$R^{11}$—NHR$^{14}$, —$R^{11}$-epoxy, —$R^{11}$—NCO, —$R^{11}$—NHCONHR$^{14}$, —$R^{11}$—NHCONR$^{14}$R$^{15}$, or —$R^{11}$—NHCOOR$^{16}$.

$R^{13}$ is —N=C=N-aryl, —N=C=N— alkyl, —N=C=N— cycloalkyl, —N=C=N— aralkyl, —NCO, —NHCONHR$^{14}$, —NHCONR$^{14}$R$^{15}$, —NHCOOR$^{16}$, —NHCOS—R$^{14}$, —COOR$^{14}$, —OR$^{14}$, epoxy, —N(R$^{14}$)$_2$, —SR$^{14}$, —OH, —NH$_2$, or —NHR$^{14}$.

$R^{14}$ and $R^{15}$ may be the same or different from each other and are independently $C_1$ to $C_{20}$ alkyl, $C_3$ to $C_{20}$ cycloalkyl, $C_7$ to $C_{18}$ aralkyl, an oligo/polyethylene glycol, and/or an oligo/polypropylene glycol.

$R^{16}$ is a substituent defined as the substituent of $R^{14}$, or a polyester group or a polyamide group.

When the polycarbodiimide compound is an oligomer carbodiimide, r is an integer of 1 to 5. When the polycarbodiimide compound is a polymer carbodiimide, r is an integer more than 5.

Preferred examples of the polycarbodiimide compound include aliphatic polycarbodiimide compounds having multiple —N=C=N— groups. More preferred examples thereof include linear aliphatic polymer compounds. Specific examples thereof include aliphatic polycarbodiimide compounds (manufactured by Nisshinbo Chemical Inc., Elastostab H01).

The amount of the carbodiimide compound to be used is in the range of 0.1 to 15 parts by mass based on 100 parts by mass of the oligomer having a (meth)acryloyl group(s) as the second component. The amount to be used described above is preferably 0.5 to 12 parts by mass and more preferably 1 to 10 parts by mass based on 100 parts by mass of the oligomer having a (meth)acryloyl group(s) as the second component.

When the carbodiimide compound is added to the photocurable sealing material according to the present embodiment, the photocurable sealing material is stable for 6 months or longer and has excellent storage stability. The properties of the photocurable sealing material or a sealing material produced by photocuring the photocurable material are not substantially adversely affected. The present inventors assume that the effect of storage stabilization caused by the carbodiimide compound occurs due to a mechanism as described below. A reaction between an active mercapto group and a double bond contained in the ene-thiol-based photocurable resin material proceeds during storage. Thus the photocurable sealing material gels, and the quality thereof is degraded. However, when the carbodiimide compound is contained in the resin material described above, the carbodiimide compound is preferentially bonded to the most active mercapto group to thereby inactivate the mercapto group. Then, degradation of the quality is suppressed by the gelling, and a storage stabilization effect occurs.

The carbodiimide compound described above also can be used as a stabilizer for an ene-thiol-based photocurable resin material. The amount of the carbodiimide compound to be added to the ene-thiol-based photocurable resin material may be varied properly and used.

<Seventh Component: Sensitizer>

A sensitizer can also be added to the photocurable sealing material according to the present embodiment for the purpose of achieving the photocuring using not only ultraviolet rays but also visible light or near-infrared rays. Examples of the sensitizer include unsaturated ketones such as chalcone derivatives and dibenzalacetone, 1,2-diketone derivatives such as camphorquinone, benzoin derivatives, fluorene derivatives, naphthoquinone derivatives, anthraquinone derivatives, xanthene derivatives, thioxanthene derivatives, xanthone derivatives, thioxanthone derivatives, coumarin derivatives, ketocoumarin derivatives, cyanine derivatives, polymethine dyes such as merocyanine derivatives and oxanol derivative, acridine derivatives, azine derivatives, thiazine derivatives, oxazine derivatives, indoline derivatives, azulene derivatives, azlenium derivatives, squarylium derivatives, porphyrin derivatives, tetraphenylporphyrin derivatives, triaryl methane derivatives, tetrabenzoporphyrin derivatives, tetrapyrazinoporphyrazine derivatives, phthalocyanine derivatives, tetraazaporphyrazine derivatives, tetraquinoxalyloporphyrazine derivatives, naphthalocyanine derivatives, subphthalocyanine derivatives, pyrylium derivatives, thiopyrylium derivatives, tetraphyllin derivatives, annulene derivatives, spiropyran derivatives, spirooxazine derivatives, thiospiropyran derivatives, metal arene complexes, and organic ruthenium complexes.

The amount of the sensitizer to be added is not particularly limited and is, for example, 0.1 to 10 parts by mass based on 100 parts by mass of the total amount of the first component to the third component. The amount to be added described above is preferably 0.2 to 5 parts by mass and more preferably 0.5 to 2 parts by mass based on 100 parts by mass of the total amount of the first component to the third component.

<Other Components>

Other components may be additionally added to the photocurable sealing material of the present embodiment. Examples of the other components include a thickening agent, a polymerization inhibitor, a pigment, an adhesiveness improver, an antioxidant agent, a curing accelerator, a filler, a plasticizer, a surfactant, a lubricant, an antistatic agent, and a stabilizer. These components may be added in a proper amount depending on their intended purposes.

<Shore 00 Hardness>

The shore 00 hardness of the sheet described above after the photocuring in the photocurable sealing material according to the present embodiment is preferably 5 to 100, more preferably 5 to 90, and even more preferably 5 to 85 under an environment of a temperature of 23° C. and a relative humidity of 50 to 60% RH. With the shore 00 hardness described above in such a range, the sealing properties are further enhanced. The shore 00 hardness can be measured, for example, by a method in compliance with ASTM D 2240.

(Preparation of Photocurable Sealing Material)

The photocurable sealing material of the present embodiment can be prepared by mixing a polythiol compound as the first component, an oligomer having a (meth)acryloyl group(s), the oligomer having a weight average molecular weight of 1000 to 30000, as the second component, a (meth)acrylate monomer as the third component, and a photo-radical polymerization initiator as the fourth component and/or a viscosity modifier as the fifth component, and as required, a carbodiimide compound as the sixth component, a sensitizer as the seventh component, and/or other components, at room temperature or under heated conditions using a mixing apparatus such as a mixer, a ball mill, or a three roll mill. The photocurable sealing material can also be adjusted by dissolving and mixing the material in a solvent or the like added thereto as a diluent, as required. Examples of the solvent to be used as a diluent include esters such as ethyl acetate, butyl acetate, and isopropyl acetate, ketones such as acetone, methyl ethyl ketone, methyl isobutyl ketone, and cyclohexanone, cyclic ethers such as tetrahydrofuran and dioxane, amides such as N,N-dimethylformamide, aromatic hydrocarbons such as toluene, and halogenated hydrocarbons such as methylene chloride.

(Method for Applying Photocurable Sealing Material)

The method for curing photocurable sealing material of the present embodiment is not particularly limited, and the curing can be carried out by irradiation with an energy ray, for example. Examples of the energy ray to be used include radioactive rays such as light and electromagnetic waves. Specific examples thereof include ultraviolet rays, visible light, infrared ray, α rays, β rays, γ rays, and electron beams. From the viewpoints of the workability, productivity, economic performance and the like, ultraviolet rays are preferably used. The time for irradiation with an energy ray may be selected as appropriate depending on the type of the energy ray used. Examples of the light source for ultraviolet rays that can be used include light sources such as superhigh pressure mercury, metal halide light sources, laser and LEDs. When α rays, β rays, γ grays, electron beams, or the like are used, curing can be allowed to proceed rapidly without addition of a photo-radical polymerization initiator. When ultraviolet rays are used, a photo-radical polymerization initiator is preferably added to the photocurable sealing material of the present embodiment.

A case in which the photocurable sealing material of the present embodiment is applied to a gasket in a housing will be described below. When the housing is composed of two components that sandwich the gasket therebetween, the housing of the present embodiment can be produced in accordance with steps (1) to (4) mentioned below:

(1) coating the photocurable sealing material uniformly onto a groove (a gasket coating portion) in each the two components;

(2) irradiating each of the coated two components with an ultraviolet ray or the like to cure the photocurable sealing material, thereby producing the gasket;

(3) as required, integrating a device to be housed inside (e.g., "a member to be inserted to the housing" such as a cable is disposed so as to astride the photocured curable sealing material portions, and sandwiched between the two components such that the photocured curable sealing material portions in the two components are faced each other); and (4) fitting the two components to each other.

In the present embodiment, the "housing" refers to a box in which a machine or an electric device having any function and components thereof are to be housed and which protects the device and the like from impact, pressure, electromagnetic wave, water, dust, light, and the like. Examples of the machine and the electric device include electronic products such as mobile phones, digital cameras, and video cameras; home electric appliances such as refrigerators, air conditioners, and washing machines, and precision apparatuses such as cameras and watches. When the photocurable sealing material of the present embodiment is used in a housing, intrusion of water, pressure, dust or the like into the housing is prevented, and the protective action of the housing as a whole cannot be compromised.

(Properties of Photocurable Sealing Material)

The photocurable sealing material of the present embodiment has high self-adhesiveness and thus has excellent sealing properties. The photocurable sealing material described above can be automatically coated by a robot on a housing without use of a mold. For this reason, the photocurable sealing material has excellent workability and mass productivity compared with those of conventional sealing materials.

EXAMPLES

Hereinbelow, the present invention will be further concretely described with reference to examples, but the present invention is not intended to be limited to these examples.

(Raw Materials)

For production of the photocurable sealing material, the following raw materials were used.

<First Component>
Polythiol: Karenz MTPE 1 (Showa Denko K. K., pentaerythritol tetrakis(3-mercaptobutyrate))

<Second Component>
Urethane acrylate A: SHIKOH UV-3000B (The Nippon Synthetic Chemical Industry Co., Ltd., weight average molecular weight: 18000)
Urethane acrylate B: SHIKOH UV-6640B (The Nippon Synthetic Chemical Industry Co., Ltd., weight average molecular weight: 5000)

<Third Component>
Acryl monomer A: 4-hydroxybutyl acrylate (4-HBA) (Osaka Organic Chemical Industry Ltd.)
Acryl monomer B: acryloyl morpholine monomer (ACMO) (KJ Chemicals Corporation)
Acryl monomer C: New Frontier PHE-2 (DKS Co. Ltd., EO-modified phenol acrylate)
Acryl monomer D: isostearyl acrylate (Osaka Organic Chemical Industry Ltd.)

<Fourth Component>
Photo-radical polymerization initiator: Irgacure 1173 (BASF Japan Ltd., 2-hydroxy-2-methyl-1-phenyl-propan-1-on)

<Fifth Component>
Viscosity modifier: AEROSIL RY200 (Nippon Aerosil Co., Ltd., AEROSIL)

<Sixth Component>
Carbodiimide compound: Elastostab H01 (Nisshinbo Chemical Inc.)

<Other Components>
Stabilizer: hydroquinone (KISHIDA CHEMICAL Co., Ltd.)

Production of Photocurable Sealing Material

Example 1

After 41 parts by mass of urethane acrylate A (manufactured by The Nippon Synthetic Chemical Industry Co., Ltd., trade name: SHIKOH UV-3000B), 10 parts by mass of urethane acrylate B (manufactured by The Nippon Synthetic Chemical Industry Co., Ltd., trade name: SHIKOH UV-6640B), 25 parts by mass of acryl monomer A (manufactured by Osaka Organic Chemical Industry Ltd., trade name: 4-HBA), 18 parts by mass pentaerythritol tetrakis(3-mercaptobutyrate) having a molecular weight of 544.8 (manufactured by Showa Denko K. K., trade name: Karenz MTPE1) as a polythiol, and 7 parts by mass of a viscosity modifier (manufactured by Nippon Aerosil Co., Ltd., trade name: AEROSIL RY200) were mixed in vacuo homogeneously with a stirrer, 1 part by mass of 2-hydroxy-2-methyl-1-phenyl-propan-1-on (manufactured by BASF Japan Ltd., trade name: Irgacure 1173) as a photo-radical polymerization initiator and 0.05 parts by mass of 1,4-benzenediol (manufactured by KISHIDA CHEMICAL Co., Ltd., trade name: hydroquinone) as a stabilizer were added thereto, and the resultant mixture was mixed homogeneously and defoamed in a stirrer, thereby obtaining a photocurable sealing material of Example 1.

Examples 2 to 8 and Comparative Example 1

Photocurable sealing materials of Examples 1 to 8 and a photocurable sealing material of Comparative Example 1 were obtained in the same manner as in Example 1 except that the raw materials were each used in accordance with the formulation described in Table 1.

Test Example

<Production of Sample>

The photocurable sealing materials obtained in Examples 1 to 8 and the photocurable sealing material obtained in Comparative Example 1 were each shaped into a sheet-like form having a thickness of 1 mm on a PET film having a thickness of 100 μm. Thereafter, each sheet obtained was UV-irradiated and cured using a UV irradiation device of an electrodeless metal halide lamp type (manufactured by Heraeus Inc., trade name: Light Hammer 6) (integrated quantity of UV-A wave: about 6000 mJ/cm$^2$). The cured sheet was cut to 25 mm in width and 200 mm in length. The main surfaces of the cut sheets were superposed on each other and subjected to a load of 10 kg for 10 seconds to form a sample. The integrated quantity in the UV irradiation was measured by a UV Power Puck manufactured by Heraeus Inc.

<Evaluation of Self-Adhesiveness and the Like>

The T-type peel strength (self-adhesion strength) in the sample immediately after application of the 10-kg load was measured in a tensile tester (manufactured by ORIENTEC CORPORATION (current A&D Company, Limited), trade name: RTC-1310A). Additionally in that case, the presence or absence of the lamination interface between two sheets was checked using a digital microscope manufactured by ANMO Electronics Corporation at a magnification of 50 times. The test was performed at a test temperature of 23° C. and a peel speed of 300 mm/min. The results are shown in Table 1.

<Evaluation of Shore 00 Hardness>

The shore 00 hardness in each sample produced as mentioned above was measured and evaluated in accordance with the following method. A plurality of cured product sheets having a thickness of about 1 mm of each photocurable sealing material were laminated to form a sample so as to achieve a thickness of about 6 mm or more, in compliance with ASTM D 2240. Thereafter, the shore 00 hardness of the sample obtained was measured with a type 00 durometer (manufactured by TECLOCK Co., Ltd., trade name: GS-754G) under an environment of a temperature of 23° C. and a relative humidity of 50 to 60% RH. The evaluation results are shown in Table 1.

TABLE 1

| | | Example 1 | Example 2 | Example 3 | Example 4 | Example 5 | Example 6 | Example 7 | Example 8 | Comparative Example 1 |
|---|---|---|---|---|---|---|---|---|---|---|
| Composition (parts by mass) | Polythiol | 18 | 18 | 18 | 18 | 18 | 18 | 18 | 18 | 18 |
| | Urethane acrylate A | 41 | 41 | 41 | 41 | 41 | 41 | 41 | 41 | 41 |
| | Urethane acrylate B | 10 | 10 | 10 | 10 | 10 | 10 | 10 | 10 | 10 |
| | Acryl monomer A | 25 | 45 | 65 | 30 | 20 | — | — | 25 | — |
| | Acryl monomer B | — | — | — | 5 | 15 | — | — | — | — |
| | Acryl monomer C | — | — | — | — | — | 29 | 45 | — | — |
| | Acryl monomer D | — | — | — | — | — | — | — | — | 25 |
| | Photo-radical polymerization initiator | 1 | 1 | 1 | 1 | 1 | 1 | 1 | 1 | 1 |
| | Viscosity modifier | 7 | 7 | 7 | 7 | 7 | 7 | 7 | 7 | 7 |
| | Carbodiimide compound | — | — | — | — | — | — | — | 0.5 | — |
| | Stabilizer | 0.05 | 0.05 | 0.05 | 0.05 | 0.05 | 0.05 | 0.05 | 0.05 | 0.05 |
| | Total | 84.05 | 104.05 | 124.05 | 94.05 | 94.05 | 88.05 | 104.05 | 84.55 | 84.05 |
| Self-adhesiveness | Presence or absence of lamination interface | Absent | Absent | Absent | Absent | Absent | Absent | Absent | Absent | Present |
| | Self-adhesion strength [N/25 mm] | 94 | 80 | 84 | 95 | 100 | 160 | 119 | 95 | 0.6 |
| | Hardness Shore 00 | 42 | 43 | 44 | 48 | 58 | 38 | 15 | 43 | 35 |

From the results of Table 1, the sheets obtained from the photocurable sealing materials of Examples 1 to 8 exhibited self-adhesiveness because of disappearance of the lamination interface between the superposed two sheets, and had a self-adhesion strength of 80 to 160 N/25 mm. The sheets obtained from the photocurable sealing materials of Examples 1 to 8 had a shore 00 hardness ranging 15 to 58. Note that the self-adhesiveness of the photocurable sealing materials of Examples 1 to 8 was also maintained one day after the sample was produced and that the lamination interface between the two sheets disappeared and the sheets remained integrated. Meanwhile, in the sheets obtained from the photocurable sealing material of Comparative Example 1, the lamination interface between the superposed two sheets was not integrated and the sheets were independent from each other. The self-adhesion strength was 0.6 N/25 mm, and the shore 00 hardness was 35.

<Water-Proof Property Test>

The photocurable sealing materials of Example 1 and Comparative Example 1 were used to conduct a water-proof property test in accordance with the following procedure.

(Production of Sample for Evaluation of Water-Proof Property)

Figure 2:
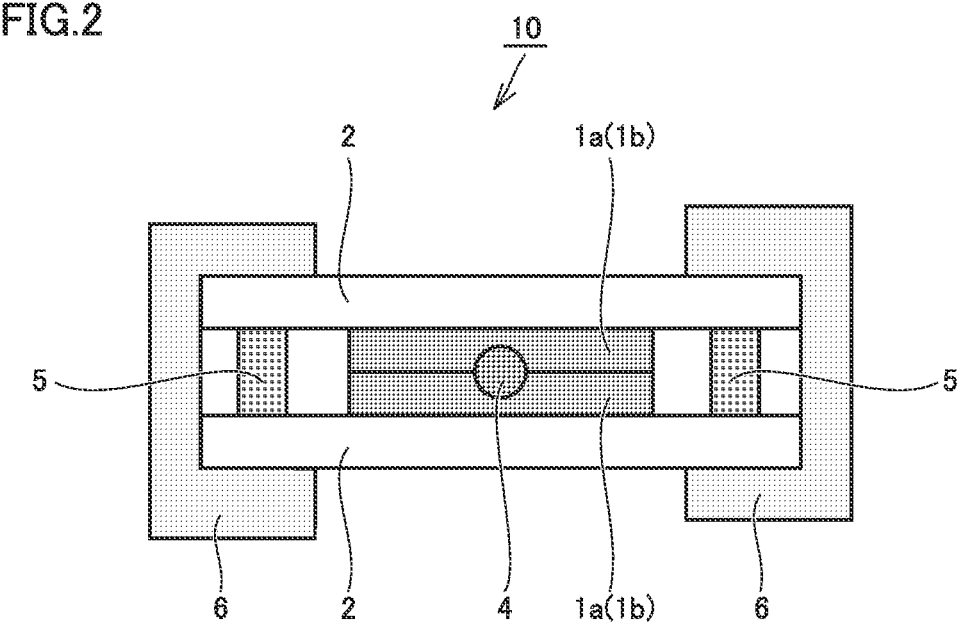
FIG. 2 is a schematic side cross-sectional view illustrating the configuration of the sample for evaluation of water-proof property.

FIG. 1 is a schematic top cross-sectional view illustrating the configuration of a sample for evaluation of water-proof property 10. FIG. 2 is a schematic side cross-sectional view illustrating the configuration of sample for evaluation of water-proof property 10. Production of sample for water-proof property 10 will be described using FIGS. 1 and 2. Each of photocurable sealing materials 1a obtained in Example 1 and Comparative Example 1 was linearly coated in a rectangle (both line width and height: 2 mm, 30-mm square) on a polycarbonate plate 2 (1-mm thickness, 100-mm square), and UV-irradiated and cured using a UV irradiation device of an electrodeless metal halide lamp type (manufactured by Heraeus Inc., trade name: Light Hammer 6) (integrated quantity of UV-A wave: about 6000 mJ/cm$^2$) (FIG. 1). Two sheets were produced for each of photocurable sealing materials 1a of Example 1 and Comparative Example 1 (hereinbelow, these are referred to a "substrate A" and a "substrate B"). The integrated quantity was measured with an illuminometer (manufactured by Heraeus Inc., UV Power Puck). Subsequently, cobalt chloride paper 3 as an index for checking ingress of water was disposed inside the rectangular frame formed with photocured sealing material 1b in substrate A (FIG. 1). Additionally, a cable 4 (diameter: 0.5 mm, length: 150 mm) wad disposed on photocured sealing material 1b in substrate A so as to astride material 1b. Subsequently, spacers 5 (thickness: 2 mm) were disposed at two points outside the rectangular frame formed of photocured sealing material 1b in substrate A. Substrate B was superposed on substrate A such that the surfaces on which photocured sealing material 1b was coated were faced each other, and the substrates were pinched and fixed with clamps 6 (FIG. 2). Thereafter, photocured sealing material 1b in substrate A and substrate B was compressed by 50% to form sample for evaluation of water-proof property 10 (FIGS. 1 and 2).

(Evaluation of Water-Proof Property)

The sample was placed in a waterproof tester containing water (manufactured by Hamron Tec. CO., LTD., trade name: submergence airtightness tester HPT8701P01) and pressurized with a predetermined pressure. Whether water penetrated inside the rectangular frame of the photocurable sealing material within two minutes was observed using change in the color of cobalt chloride paper as an index. In other words, in the case where the color of the cobalt chloride paper remained blue, the sample was determined to have passed the waterproof test, and in the case where the color of cobalt chloride paper changed from blue to red, the sample was determined to have failed the waterproof test. The results are shown in Table 2.

TABLE 2

| | | Example 1 | Comparative Example 1 |
|---|---|---|---|
| Composition (parts by mass) | Polythiol | 18 | 18 |
| | Urethane acrylate A | 41 | 41 |
| | Urethane acrylate B | 10 | 10 |
| | Acryl monomer A | 25 | — |
| | Acryl monomer D | — | 25 |
| | Photopolymerization initiator | 1 | 1 |
| | Viscosity modifier | 7 | 7 |
| | Stabilizer | 0.05 | 0.05 |
| | Total | 84.05 | 84.05 |
| Self-adhesiveness | Presence or absence of lamination interface | Absent | Present |
| | Self-adhesion strength [N/25 mm] | 94 | 0.6 |

TABLE 2-continued

|  |  | Example 1 | Comparative Example 1 |
|---|---|---|---|
| Hardness Shore 00 |  | 42 | 35 |
| Water-proof property | 10 kPa | Passed | Failed |
|  | 30 kPa | Passed | Failed |
|  | 50 kPa | Passed | Failed |

From the result, the photocurable sealing material having self-adhesiveness was shown to have excellent water-proof property.

As mentioned above, the embodiments and examples of the present invention have been described, but appropriate combinations of the configurations of each embodiment and each example have been planned from the beginning.

It should be construed that embodiments disclosed herein are by way of illustration in all respects, not by way of limitation. It is intended that the scope of the present invention is defined by claims, not by the embodiments and examples described above, and includes all modifications and variations equivalent in meaning and scope to the claims.

REFERENCE SIGNS LIST 1a photocurable sealing material, 1b photocured sealing material, 2 polycarbonate plate, 3 cobalt chloride paper, 4 cable, 5 spacer, 6 clamp, 10 sample for evaluation of water-proof property.

The invention claimed is:

1. A photocurable sealing material comprising at least a polythiol compound as a first component, and a third component comprising a (meth)acrylate monomer selected from the group consisting of 4-hydroxybutyl acrylate or 2-hydroxy-3-phenoxypropyl acrylate, wherein in the case where the photocurable sealing material is used to produce two sheets having a thickness of 1 mm, a width of 25 mm, and a length of 200 mm, the two sheets are photocured by irradiation with an ultraviolet ray, then the photocured sheets are laminated, and the laminate is subjected to a load of 10 kg for 10 seconds, an action of causing the lamination interface between the two sheets to disappear is exhibited, and the self-adhesion strength in a T-type peel test is 5 N/25 mm or more when the sheets are pulled at a peel speed of 300 mm/min.

2. The photocurable sealing material according to claim 1, wherein the self-adhesion strength is from 5 N/25 mm to 1000 N/25 mm when the sheets are pulled at a peel speed of 300 mm/min.

3. The photocurable sealing material according to claim 1, wherein the sheets after the photocuring have a Shore 00 hardness of 5 to 100 under an environment of a temperature of 23° C. and a relative humidity of 50 to 60% RH.

4. The photocurable sealing material according to claim 1, wherein
the photocurable sealing material comprises, in addition to the first component, a second component and a fourth component and/or a fifth component,
the second component is an oligomer having a (meth)acryloyl group(s), the oligomer having a weight average molecular weight of 1000 to 30000,
the fourth component is a photo-radical polymerization initiator,
the fifth component is a viscosity modifier,
the photocurable sealing material comprises 5 to 100 parts by mass of the third component based on 100 parts by mass of the second component, and
a ratio between the total number of (meth)acryloyl groups contained in both of the second component and the third component and the total number of mercapto groups in the first component is 100:5n to 100:25n, wherein n is the number of mercapto groups per molecule of the polythiol compound.

5. The photocurable sealing material according to claim 4, wherein the second component comprises at least one selected from the group consisting of a urethane-based (meth)acrylate oligomer, a polyester-based (meth)acrylate oligomer, a polyether-based (meth)acrylate oligomer, a (meth)acryl (meth)acrylate oligomer, an epoxy-based (meth)acrylate oligomer, a conjugated diene polymer-based (meth)acrylate oligomer, and a silicone (meth)acrylate oligomer, and hydrogenated products thereof.

6. The photocurable sealing material according to claim 4, further comprising 0.1 to 15 parts by mass of a carbodiimide compound, as a sixth component, based on 100 parts by mass of the second component.

* * * * *